United States Patent

[11] 3,587,087

[72] Inventor Eugene King
Yardley, Pa.
[21] Appl. No. 675,940
[22] Filed Oct. 17, 1967
[45] Patented June 22, 1971
[73] Assignee RCA Corporation

[54] DIGITAL COMPANDING LOOP FOR MONOBIT ENCODER/DECODER
11 Claims, 3 Drawing Figs.

[52] U.S. Cl. .......... 340/347
[51] Int. Cl. .......... H03k 13/04
[50] Field of Search .......... 340/347
AD: 325/38 A. 38.1: 179/15 APC

[56] References Cited
UNITED STATES PATENTS
3,393,364 7/1968 Fine .......... 325/38 (.1)
3,452,297 6/1969 Kelly et al. .......... 340/347 X

*Primary Examiner*—Maynard R. Wilbur
*Assistant Examiner*—Michael K. Wolensky
*Attorneys*—Edward J. Norton and James B. Hayes

ABSTRACT: There is disclosed a digital communication system for producing and transmitting digital representations of amplitude variant analog signals such as speech. The system's encoder employs a monobit sampling technique in conjunction with a series of digital companding feedback loops. The digital companding loops are utilized to apply internal feedback level variation in the encoder for certain successive bit values indicative of the amplitude conditions of the input signal. Corresponding companding is provided in the system's decoder to produce a substantially accurate multiple step waveform approximation from the single bit per sampling interval quantizing of the original analog input signal.

Inventor:
EUGENE KING
By Edward J. Norton
Attorney

Inventor:
EUGENE KING
By Edward J Norton
Attorney

DIGITAL COMPANDING LOOP FOR MONOBIT ENCODER/DECODER

BACKGROUND OF THE INVENTION

Pulse systems for communication of voice and telemetry data are widely used today since they offer the advantages of good signal-to-noise performance as well as efficient transmission through the use of multiplexing.

Many techniques exist in the prior art for encoding and decoding the data to be communicated. These techniques while accomplishing satisfactory performance present certain drawbacks. Those employing multibit sampling such as Three Bit, Log Differential Pulse Code Modulation (PCM), require appreciable bandwidth for operation in an already crowded communication frequency spectrum. Others employing monobit sampling, such as Variable Slope Delta Modulation (VSD), require intricate devices such as up-down counters, linear ladder networks, and pulse counting slope control circuitry in both the encoding and decoding circuits of each channel. Such devices increase the complexity and cost per channel of the system. Standard Delta Sigma Modulators and other monobit modulation techniques produce overshoots and undershoots in the approximation which result in distortion of the decoded output signal. To overcome this, such systems must be operated at high sampling rates.

It is therefore an object of the present invention to provide an improved pulse communication system which can be operated at reduced bandwidth.

Another object is to provide a simplified and less costly encoding and decoding technique for pulse communications.

A further object is to provide a digital encoder/decoder system that can be operated at low sampling rates.

In one embodiment of the invention there is provided a digital encoding circuit of the delta sigma type in which the presence and absence of bit pulses are transmitted at uniformly spaced sampling intervals; the presence and absence of pulses representing "1" bits and "0" bits respectively. The quantizing circuitry of the encoder includes a summing amplifier, integrator, comparator, sampling pulse generator and logic gates the output of which provides the coded bit stream. A first negative feedback control loop around the encoder generates a signal which is fed back to the encoder input for combination with the analog input signal to form a difference signal which is integrated and primes the comparator for the next quantizing decision. The negative feedback is provided by a flip-flop which is indicative of the sense of the integrated difference signal at the last sampling time, and is driven by the logic gates to produce a bi-polar full bauded signal whose polarity is always opposite to the detected sense of the integrated difference signal. A full bauded signal is defined as one whose level is constant for the complete period between sampling periods.

According to a feature of the present invention, additional information concerning successive bit values indicative of the amplitude conditions of the analog input signal is derived. From this information a series of bi-level digital signals are generated and also fed back to the input of the encoder to modulate the result produced by the first negative feedback loop. The information regarding successive presence or absence of a bit pulse indicative of successive amplitude conditions of the input signal is available as a second output of the flip-flop. This information is compiled for successive sampling intervals in a digital storage multistage shift register. The stored information is outputed to a series of gate and level generators each of which is enabled for a different sequence of successive bit values. Thus each gate and level generator when enabled, provides a different additional full bauded feedback voltage to the input of the encoder only for successive bit values indicative of the amplitude conditions of the input which cannot be accurately sensed by the fixed level of the first negative feedback control loop. These additional feedback paths permit a multilevel step variation of the feedback reference which is used to follow the input signal amplitude, although only a single bit sample is employed. This enables the integrated difference between the present input signal condition and the feedback level indicative of the last condition of the input, to remain close to the firing level of the comparator thereby minimizing over and under shoots in the quantizing of the input signal.

The decoder recovers the data from the incoming bit stream by a corresponding process of level variation according to successive present or absent pulses in the bit stream. Pulses are shaped and fed to a flip-flop which responds to the presence and absence of pulses to produce a full bauded bi-polar waveform. Information regarding the presence or absence of a bit pulse at each of several successive sampling intervals is extracted from the shaped bit stream by a multistage shift register. Bit retiming is provided to insure proper sequencing of the storage and flip-flop operations. The stored information is outputed to a series of gate and level generators each of which is enabled for a different sequence of successive presence or absence of bit pulses. Each of the gate and level generators when enabled, provides a full bauded output level which is identical in amplitude but opposite in polarity to its corresponding gate and level generator in the encoder. These levels are summed with the bi-polar output of the flip-flop to form a multilevel step waveform which when filtered closely approximates the input analog signal.

The multilevel step variation feature of the encoder and decoder from a single bit per sample permits operation of the present invention at reduced sampling rates while retaining good fidelity. Since all circuits are direct coupled, the converter can be used for amplitude variant and/or direct current (DC) level input data.

Figure 1:
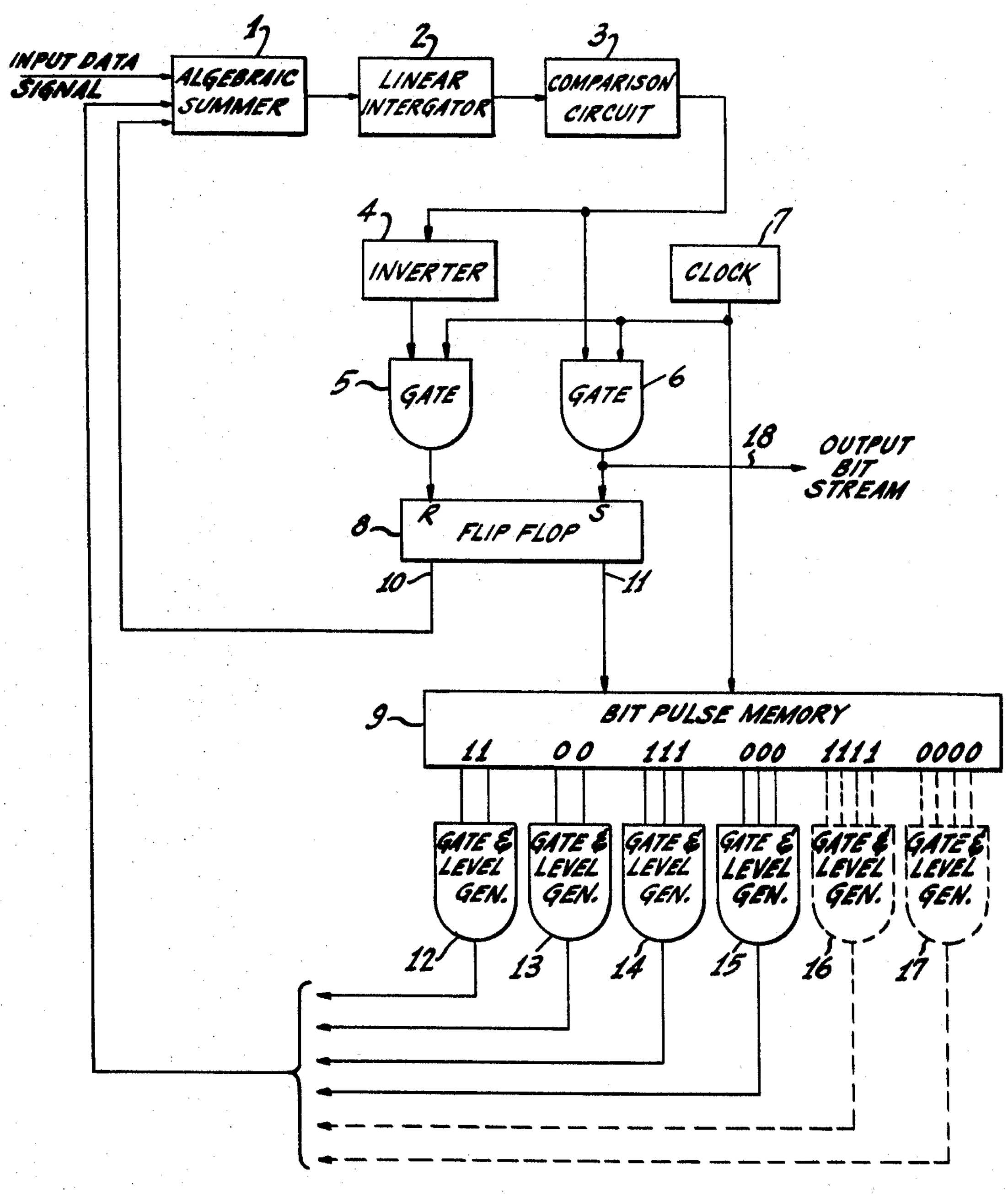
FIG. 1 is a block diagram of one embodiment of a pulse encoding circuit according to the invention.

If reference is made to FIG. 1, there is shown the encoder portion of the present invention. The signal containing the data to be encoded is fed into the algebraic summer 1. The output of the algebraic summer 1 is processed through linear integrator 2 to a comparison circuit 3. The output of the comparison circuit 3 is fed in parallel to a first gate 6 and through inverter 4 to a second gate 5. Pulses from clock 7 are also fed to gates 5 and 6. The output of gate 6 is coupled to the "set" input, denoted by the letter S, of a flip-flop 8. The encoder output appears on lead 18 which is also coupled to the output of gate 6. The output of gate 5 is fed to the reset input, denoted by the letter R, of flip-flop 8. A first output at terminal 10 of flip-flop 8 is fed back to the algebraic summer 1. A second output at terminal 11 of flip-flop 8 forms one input to a bit pulse memory 9. Pulses from the clock 7 provide a second input to the bit pulse memory 9. The sequence of output signals from the bit pulse memory 9 are fed to gate and level generators 12 through 17 whose outputs in turn are fed back to the algebraic summer 1.

In the operation of the encoder of FIG. 1, the comparison circuit 3 produces an output pulse whenever the integrated difference signal presented to it by the linear integrator 2 is positive and greater than its firing level which is at or near zero volts. According to the adopted convention, the presence of an output pulse from the comparison circuit represents a logical decision of a "1" corresponding to the condition where the integrated difference signal exceeds the firing level of the comparison circuit 3. The absence of an output represents a logical decision of "0" corresponding to the condition where the integrated difference signal does not exceed the firing level of the comparison circuit 3. If at sampling time $t_1$ a logical "1" is present, gate 6 will pass a pulse from the clock 7 to "set" the flip-flop 8. When the flip-flop 8 is in the "set" condition a full bauded negative voltage appears at output terminal 10 of flip-flop 8. This negative voltage is fed back and combined with the incoming analog signal in the algebraic summer 1 to develop a difference signal. The difference signal is smoothed in the linear integrator 2 to minimize noise perturbation and fed to the comparison circuit 3 for the next logical decision. Now at $t_2$, as determined by the clock 7, if the input analog signal has not increased in a positive sense by an amount sufficient to overcome the negative feedback, a logical "0" decision is produced by the comparison circuit 3. This logical "0" inhibits the output of gate 6 and causes inverter 4 to enable gate 5 to pass a pulse from the clock 7 to the "reset" input of flip-flop 8. When the flip-flop 8 is in the reset condition a full bauded positive voltage appears at output terminal 10 of flip-flop 8 which is fed back and combined with the incoming analog signal in the algebraic summer 1. Thus a feedback level is always provided whose polarity is opposite to the indicated polarity of the integrated difference signal thereby providing the necessary reference level for sensing the amplitude behavior of the input between sampling periods. At the same time the sequence of logical decisions of "1" or "0" produces a stream of bit pulses on lead 18 whose presence or absence correspond to the condition of the integrated difference signal presented to the comparison circuit 3 at each sampling interval.

Step variation of the feedback level for quantizing sustained increases and decreases of the input analog signal is provided by a series of additional feedback loops comprised of bit pulse memory 9 and gate and level generators 12 through 15. Bit pulse memory 9 may be implemented by a suitable digital storage device such as a multistage shift register. Gate and level generators 12 through 15 may be implemented by standard logic gates such as AND gates which drive Zener clamped flip-flops or other suitable constant level output devices. The output of flip-flop 8 at terminal 11 is the complement of the output at terminal 10 and therefore contains the information of the sequence of logical "1" and "0" decisions indicative of amplitude conditions of the analog input signal. This information is fed into the bit pulse memory 9, which in response to pulses from the clock 7, stores the logical decisions for successive samples of the integrated difference signal. When bit pulse memory 9 senses two successive logical "1" indicating a persistent positive disposition of the integrated difference signal, gate and level generator 12 is enabled in response to the combination of output pulses produced by bit pulse memory 9. Gate and level generator 12 causes an additional full bauded negative voltage level to be fed back to the algebraic summer 1 for comparison with the analog input signal for as long as the condition of two successive logical "1" persists. If three successive logical "1" are sensed indicating a continued positive disposition, gate and level generator 14 is enabled. Gate and level generator 14 causes a third full bauded negative voltage level to be fed back to the algebraic summer 1 for as long as the condition of three successive logical "1" persists. Gate and level generators 13 and 15 are enabled for two and three successive logical "0" respectively and cause a full bauded positive fixed level to be fed back to the algebraic summer 1 for as long as those conditions persist. The internal feedback may be further altered for any number of successive conditions by the addition of gate and level generators such as 16 and 17, denoted by dashed lines, which are enabled for four successive logical "1" and "0" respectively. The multilevel feedback variation enables the encoder to update and correct the approximation by permitting the integrated difference signal of linear integrator 2 to more closely follow the amplitude conditions of the analog input signal. The amplitude of the levels fed back by the gate and level generators 12 through 17, for successive logical "1" and "0" conditions, relative to the level fed back from terminal 10 of flip-flop 8 may be in a ratio of 2:1, 3:1 or even a logarithmic relationship, depending upon the particular amplitude variation characteristics of the analog input signal to be encoded. Since the gate and level generators are enabled only when a particular sequence of logical "1" and "0" exists, the condition for which the particular corrective feedback level variation is introduced may be fixed. By a proper choice of the feedback level ratios and the conditions for which they are introduced, an output bit stream is produced on lead 18 which is an optimum approximation of the input data signal.

Figure 2:
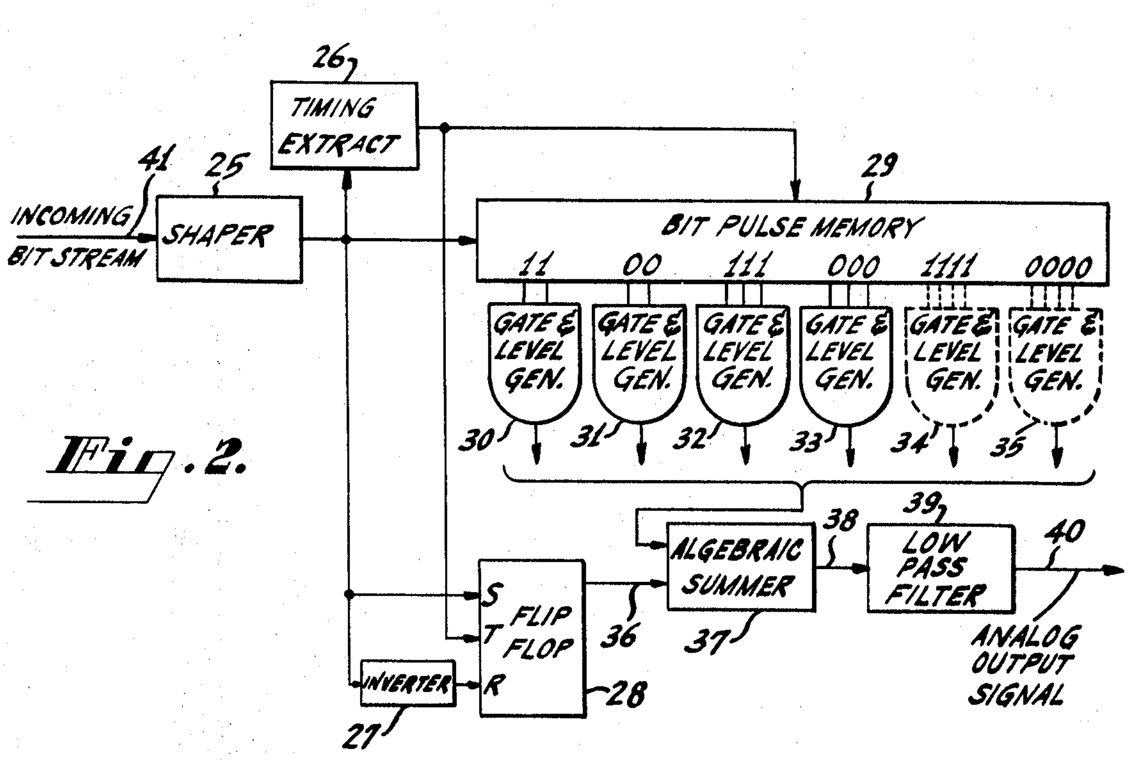
FIG. 2 is a block diagram of one embodiment of a pulse decoding circuit according to the invention.

If reference is made to FIG. 2, there is shown the decoder portion of the present invention. The incoming bit stream 41 to be decoded is fed into a shaper 25. The output of shaper 25 is fed in parallel to timing extract 26, bit pulse memory 29, the "set" (S) input of flip-flop 28 and through inverter 27 to the "reset" (R) input of flip-flop 28. The output of timing extract 26 is fed to the trigger input (T) of the flip-flop 28 and forms the second input to bit pulse memory 29. The output of flip-flop 28 at terminal 36 is coupled to the input of an algebraic summer 37. The sequence of output signals from the bit pulse memory 29 are fed to gate and level generators 30 through 35 whose outputs in turn are coupled to the input of the algebraic summer 37. The output of algebraic summer 37 is fed through low pass filter 39 to produce an analog output signal on lead 40.

In the operation of the decoder of FIG. 2, the incoming bit stream 41 is reshaped in shaper 25 to compensate for possible distortion of the pulses during transmission from the encoder. Timing extract 26 which is coupled to the bit stream output of shaper 25 re-establishes the proper timing for operation of the decoder by providing clock pulses to the bit pulse memory 29 and the trigger input (T) of flip-flop 28. Bit pulse memory 29 and the gate and level generators 30 through 35 which it feeds may be implemented in the same manner as described for the encoder portion of the present invention. However in the operation of the decoder, flip-flop 28 and the gate and level generators 30 through 35 produce signals which are identical in amplitude but inverted in polarity to their counterparts in the encoder of FIG. 1. This preserves the relative scaling established in the encoder and permits consistent logical decoding of the bit stream 41. Thus the presence of a bit pulse, representing a logical "1" in the bit stream 41, at the "set" (S) input of flip-flop 28 cause its output terminal 36 to feed a full bauded positive level to the algebraic summer 37. The absence of a bit pulse representing a logical "0" enables inverter 27 to reset the flip-flop 28 thereby causing a full bauded negative level to be fed from terminal 36 to the algebraic summer 37. At the same time bit pulse memory 29 stores the sequence of "1" and "0" of the incoming bit stream. When bit pulse memory 29 senses two successive logical "1," gate and level generator 30 is enabled in response to the combination of output pulses produced by bit pulse memory 29. Gate and level generator 30 thereby provides a full bauded positive level to the algebraic summer 37 for as long as the condition of two successive "1" persists. If three successive logical "1" are sensed, gate and level generator 32 is enabled and a third full bauded positive level is fed to the algebraic summer 37 for as long as the condition of three successive "1" persists. Gate and level generators 31 and 33 are enabled for two and three successive logical "0" respectively and cause a full bauded negative level to be fed to the algebraic summer 37 for as long as those conditions persist. The ratio of the amplitudes of the constant level signals of the respective gate and level generators to the output level of flip-flop 28 and the conditions for which they are introduced are fixed to correspond exactly to those employed in the encoder of FIG. 1. The resulting combination of these signals in the algebraic summer 37 produces a multilevel full bauded step waveform on lead 38 although only a single bit pulse per sample technique was used for encoding. This step waveform is then passed through a low pass filter 39 which smoothes the signal into a continuous analog output voltage on lead 40 which corresponds to the input data signal.

Figure 3:
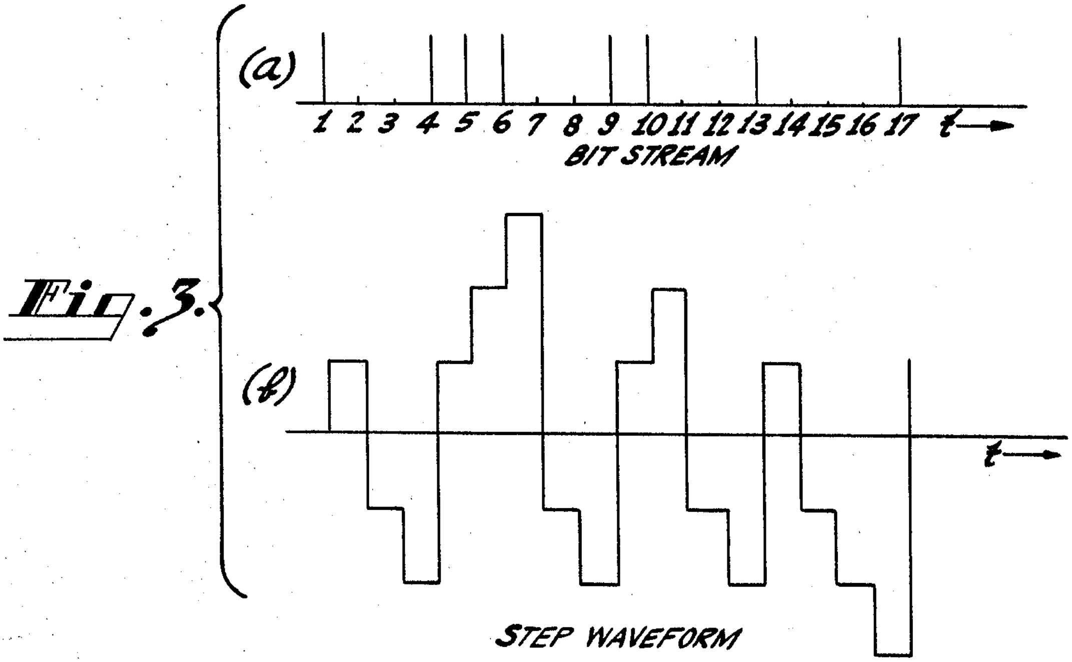
FIG. 3 is a waveshape diagram illustrating a typical bit stream and its corresponding decoded step waveform.

If reference is made to FIG. 3 there is shown in part (*a*) a typical single pulse per sample bit stream input to the decoder of FIG. 2. Part (*b*) of FIG. 3 shows the corresponding step waveform which is produced at lead 38 of the decoder of FIG. 2.

It is to be understood that the above-described arrangements are only illustrative of one method of implementation and application of the invention. Numerous other arrangements may be devised such as application of the multiple companding loop feature of the invention to other monobit encoding schemes such as Delta Modulation.

What I claim is:

1. The combination with a monobit digital encoding system having an encoder including a feedback loop around said encoder to provide a first reference level for sensing amplitude conditions of an input analog signal and for generating a coded bit stream of the type in which the presence or absence of bit pulses at uniformly spaced intervals depend upon the amplitude difference between said input analog signal and said feedback signal, comprising:

a. means responsive to the condition of said bit stream for generating signals indicative of different combinations of successive values of said bit stream;

b. first logic means responsive to said signals generated by said first-mentioned means, said first logic means generating a predetermined signal level when a given condition of said bit stream is present during a period of two successive sampling intervals;

further logic means responsive to said signals generated by said first-mentioned means for generating a second predetermined signal level when a second condition including said first condition of said bit stream is present during a period of three successive sampling intervals; and c. fourth means for simultaneously feeding said predetermined signal levels generated by said first and further logic means into the input of said encoder to provide a composite amplitude variation of said first reference level according to particular successive values present in said bit stream.

2. The digital encoder as recited in claim 1, wherein:

the ratio of the amplitude of the signal generated by at least one of said logic means relative to the amplitude of the first reference level is a linear relationship.

3. The digital encoder as recited in claim 1, wherein:

the ratio of the amplitude of the signal generated by at least one of said logic means relative to the amplitude of the first reference level is a nonlinear relationship.

4. In combination with a delta sigma modulator of the type wherein an algebraic summer, an integrator, a comparator and digital logic means are provided for encoding an analog input signal; and wherein said digital logic means provides a feedback reference signal at the input of the algebraic summer for combination with said analog signal to produce a difference signal which is integrated and compared to a threshold level for providing a stream of bit pulses at uniform sampling intervals, the improvement therewith comprising:

storage means coupled to said digital logic means for storing signals indicative of the existence of a bit pulse at consecutive sampling intervals;

first means, including a logic controlled level generator coupled to said storage means and responsive to said stored signals for generating a full bauded level when a given condition of said bit pulses is present during a period of two successive sampling intervals;

second means, including a logic control level generator, coupled to said storage means and responsive to said stored signals for generating a second full bauded level when a second condition including said first condition of said bit pulses is present during a period of three successive sampling intervals; and means for coupling the full bauded signals from said first and second means to the input of said encoder to simultaneously provide a composite step variation of the amplitude of said feedback reference signal according to the detected successive conditions of said bit streams.

5. In a monobit digital decoding circuit, for generating an analog signal from a coded bit stream input, in which the amplitude information to be recovered is represented by the presence and absence of bit pulses at uniformly spaced intervals; and wherein a flip-flop circuit responsive to the bit stream provides a full bauded voltage of one polarity when a bit pulse is present and the opposite polarity when a bit pulse is absent at each interval, the combination comprising:

a. means responsive to the condition of said bit stream at each of several consecutive intervals for generating signals indicative of particular combinations of successive conditions of said bit stream;

b. a plurality of logic means responsive to said signals, each of said logic means providing a different full bauded voltage only when a particular combination of successive conditions of said bit stream are present;

c. means for combining the output voltage of said flip-flop circuit with the output voltages of said plurality of logic means to form a resulting step waveform; and d. means coupled to said combining means, for smoothing said step waveform into a continuous analog signal.

6. The digital decoder as recited in claim 5 wherein:

the ratio of the amplitude of the full bauded signal generated by each of said logic means relative to the amplitude of the output voltage of said flip-flop circuit is a linear relationship.

7. The digital decoder as recited in claim 5 wherein:

the ratio of the amplitude of the full bauded signal generated by each of said logic means relative to the amplitude of the output voltage of said flip-flop circuit is a nonlinear relationship.

8. In combination with a delta sigma demodulator of the type wherein a pulse shaper, bit retiming circuit, a flip-flop circuit and filter means are used to produce a continuous analog signal from a coded bit stream input; and wherein the flip-flop circuit provides a bi-polar full bauded output voltage in response to the presence and absence of pulses at uniformly spaced intervals of the bit stream, the improvement therewith comprising:

a. storage means coupled to said pulse shaper and said bit retiming circuit for storing signals indicative of the existence of a bit pulse at consecutive intervals of said bit stream;

b. first means, including a logic controlled level generator, coupled to said storage means and responsive to said stored signals for generating a full bauded positive level only when bit pulses are present at two successive uniformly spaced intervals of said bit stream;

c. second means, including a logic controlled level generator, coupled to said storage means and responsive to said stored signals for generating a full bauded positive level only when bit pulses are present at three successive uniformly spaced intervals of said bit stream;

d. third means, including a logic controlled level generator, coupled to said storage means and responsive to said stored signals for generating a full bauded negative level only when bit pulses are absent at two successive uniformly spaced intervals of said bit stream;

e. fourth means, including a logic controlled level generator, coupled to said storage means and responsive to said stored signals for generating a full bauded negative level only when bit pulses are absent at three successive uniformly spaced intervals of said bit stream; and f. an algebraic summer which is interposed between the output of said flip-flop and the input of said filter means for combining the bi-polar output voltage of said flip-flop with the output voltage of said first, second, third and fourth means to form a step waveform input to said filter means.

9. The combination for digitally encoding an analog signal comprising:

a. an algebraic summer to which said analog signal is fed;

b. an integrator coupled to the output of said summer;

c. comparison means responsive to the output of said integrator for producing an output pulse when the output of said integrator is greater than a predetermined value;

d. a pulse generator for providing a sequence of sampling pulses at fixed time intervals;

e. a first logic gate coupled to the output of said comparison means and said pulse generator, said gate producing an output pulse whenever said comparison means output pulse is present in the presence of a sampling pulse;

f. an inverter circuit also coupled to the output of said comparison means, said inverter producing an output pulse only when said comparison means output pulse is not present;

g. a second logic gate coupled to the output of said inverter and said pulse generator which produces an output pulse when said inverter output pulse is present in the presence of a sampling pulse, h. electrical conducting means coupled to the output of said first logic gate to provide a transmission path for the encoder bit stream output formed by the output pulses from said first gate;

i. flip-flop means coupled to the output of said first and second logic gates, said flip-flop means producing a first full bauded voltage output of one polarity in the presence of an output pulse from said first gate and the opposite polarity in the presence of an output pulse from said second gate, said flip-flop means also producing a second full bauded output which is the complement of said first output voltage;

j. means for coupling said first full bauded voltage output of said flip-flop means to the input of said algebraic summer;

k. storage means coupled to said second output of said flip-flop and said pulse generator for storing signals indicative of the state of said flip-flop means at consecutive sampling times;

l. a plurality of logic controlled level generating means coupled to said storage means and responsive to said stored signals, each of said level generator means providing a full bauded output voltage for a different combination of said stored signals, and m. means for coupling the output voltage of each of said logic controlled level generator means to the input of said algebraic summer.

10. The combination for decoding a coded stream of bit pulses comprising:

a. a pulse shaper coupled to said coded bit pulse stream;

b. timing means coupled to the output of said pulse shaper for producing a succession of timing pulses at fixed intervals;

c. an inverter circuit also coupled to the output of said pulse shaper for providing an output pulse whenever a bit pulse is present at the output of said pulse shaper, no output pulse being provided by said inverter whenever a bit pulse is absent at the output of said pulse shaper;

d. flip-flop means coupled to the output of said pulse shaper, said inverter and said timing means for producing a full bauded output voltage of one polarity whenever a pulse is present at the output of said pulse shaper and the opposite polarity whenever a pulse is present at the output of said inverter;

e. storage means coupled to said pulse shaper and said timing means for storing signals indicative of the state of said flip-flop means at consecutive sampling times;

f. a plurality of logic controlled level generating means coupled to said storage means and responsive to said stored signals, each of said level generator means providing a full bauded output voltage for a different combination of said stored signals;

g. an algebraic summer coupled to the output of each of said level generating means and the output of said flip-flop means for producing a step waveform which is the sum of the voltages at the output of said flip-flop and said plurality level generating means;

h. filter means responsive to said step waveform of said algebraic summer for smoothing said signal into a continuous analog signal.

11. A digital communication system comprising:

a. input means to which a first analog signal containing information to be transmitted is applied;

b. a first signal processing path responsive to said first signal for generating a coded bit stream representative of the amplitude variation of said first signal, said first signal processing path including a negative feedback control loop which provides a voltage reference for sensing the amplitudes changes of said first signal;

c. means coupled to said first signal processing path for generating a first plurality of full bauded signals each of said full bauded signal being present only for a particular sequence of successive conditions of said first signal;

d. means for combining said plurality of signals with said voltage reference to produce a step variation of said voltage reference;

e. a second signal processing path coupled to said coded bit stream for generating a bi-polar full bauded signal in response to said bit stream, said full bauded signal being one polarity when a bit pulse is present in the bit stream and the opposite polarity when a bit pulse is absent from the bit stream;

f. means coupled to said second signal processing path for generating a second plurality of full bauded signals each of said full bauded signal being present only for a particular succession of bit pulses in said bit stream;

g. means for combining said second plurality of signals with said bi-polar signal to form a multilevel step waveform signal; and h. means coupled to said combining means for smoothing said step waveform to produce a second analog signal whose amplitude corresponds to the amplitude of said first analog signal.